United States Patent [19]

Burke

[11] Patent Number: 4,856,271
[45] Date of Patent: Aug. 15, 1989

[54] GAS GENERATOR AND GENERATING METHOD EMPLOYING DUAL CATALYTIC AND THERMAL LIQUID PROPELLANT DECOMPOSITION PATHS

[75] Inventor: W. K. Burke, Bellevue, Wash.

[73] Assignee: Olin Corporation, Stamford, Conn.

[21] Appl. No.: 104,303

[22] Filed: Oct. 1, 1987

[51] Int. Cl.$^4$ .............................................. F02C 3/20
[52] U.S. Cl. ............................... 60/39.02; 60/39.462; 60/723; 422/218
[58] Field of Search ................ 60/200.1, 723, 39, 462, 60/260, 204, 39.02; 422/115, 218, 181

[56] References Cited

U.S. PATENT DOCUMENTS

| | | | |
|---|---|---|---|
| 3,135,703 | 6/1964 | Sill | 60/39.462 |
| 3,377,140 | 4/1968 | Hall | 60/39.462 |
| 3,535,879 | 10/1970 | Kuntz | 60/200.1 |
| 3,695,041 | 10/1972 | Eggers et al. | 60/39.462 |
| 4,568,524 | 2/1986 | Pelrine | 422/218 |

Primary Examiner—Donald E. Stout
Attorney, Agent, or Firm—Bruce E. Burdick

[57] ABSTRACT

A propulsive power-producing system has a vessel defining a pressure chamber and an injector and a thrust-producing nozzle communicating with the chamber at respective upstream and downstream ends of the vessel. A dual catalytic/thermal gas generator housed in the vessel chamber includes a catalyst bed enclosed by a sleeve, a bedplate and the upstream vessel end. The sleeve is spaced inwardly from the side of the vessel to define an annulus therebetween. When a propellant liquid is injected under pressure through the injector into the catalyst bed, a first fraction of the liquid flows along a first path which leads through the bed and concurrently is catalytically decomposed into a first fraction of propellant gas which exits through openings in the bedplate into a mixing passage which leads to the nozzle. A remaining fraction of the liquid overflows along a second path which leads through orifices in the sleeve into and through the annulus and concurrently is thermally decomposed therein by contact with the heated sleeve into a second fraction of propellant gas. The second gas fraction exits through holes in the bedplate and into the passage wherein it mixes with the first gas fraction before exiting through the nozzle.

6 Claims, 1 Drawing Sheet

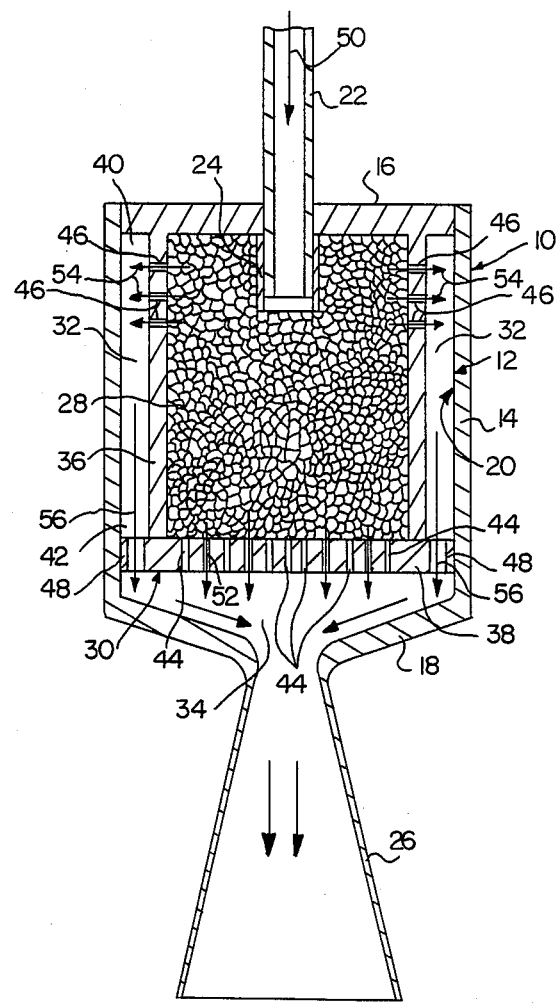

GAS GENERATOR AND GENERATING METHOD EMPLOYING DUAL CATALYTIC AND THERMAL LIQUID PROPELLANT DECOMPOSITION PATHS

BACKGROUND OF THE INVENTION

1. Field of the Invention

The present invention generally relates to gas generators employed in small rocket engines and, more particularly, is concerned with a dual catalytic/thermal gas generator and generating method which achieves a reduction in catalyst bed pressure drop at any given rate of bedloading.

2. Description of the Prior Art

Small rocket engines of the type utilized in space satellites are generally of a design which employs a catalytic gas generator to convert a liquid propellant, such as hydrazine, into a high-temperature, propulsive power-producing gas. The gas generator has a catalyst bed in communication with the thrust chamber of the engine. The liquid propellant is injected into the catalyst bed where it reacts to produce the high-temperature gas. The gas exits from the catalyst bed and is expanded through a nozzle on the aft end of the chamber to produce thrust.

It is desirable to be able to operate a conventional catalytic gas generator at as high a bedloading rate (mass flow/unit area) as possible since weight, volume and cost are reduced as the ratio of mass flow to unit area increases. However, the bedloading rate is limited by the compressive strength of the catalyst bed of the generator. As the bedloading rate increases, the pressure drop across the bed increases, eventually crushing the bed which results in destruction of the generator and termination of the usefulness of the rocket engine.

In view of the desirability of gas generator operation at highest possible bedloading rates, a need exists for a fresh approach to gas generator design toward the objective of reducing pressure drop across the catalyst bed at any given rate of bedloading.

SUMMARY OF THE INVENTION

The present invention provides a dual catalytic/thermal gas generator and generating method designed to satisfy the aforementioned needs. The dual catalytic/thermal gas generator of the present invention (which hereinafter, for the sake of brevity, will frequently be referred to as the "dual gas generator") cojoins a thermal bypass passage in parallel with a catalyst bed to provide respective dual paths for decomposition of a liquid propellant catalytically and thermally into a high-temperature, propulsive power-producing gas. By such arrangement, the dual gas generator achieves a significant reduction in pressure drop across its catalyst bed compared to that experienced across the catalyst bed in a conventional catalytic gas generator at the same bedloading rates. Therefore, the dual gas generator can operate at higher bedloading rates than a conventional catalytic gas generator without deleteriously affecting the structural integrity of the catalyst bed and limiting the useful life of the rocket engine itself.

Accordingly, the present invention is directed to a dual catalytic/thermal gas generator in a propulsive power-producing system which has a vessel defining a pressure chamber therein and a propellant liquid inlet in the form of an injector and a propellant gas outlet in the form of a thrust-producing nozzle communicating with the chamber at respective upstream and downstream ends of the vessel. The dual gas generator includes (a) a catalyst bed disposed in the pressure chamber in communication with the propellant liquid inlet in the upstream end wall of the vessel; (b) enclosure means encompassing the catalyst bed so as to define an annulus between the side wall of the vessel and the bed and a mixing passage adjacent the downstream end wall of the vessel leading from the annulus and bed to the propellant gas outlet; (c) first means formed through the enclosure means for defining a first flow path which leads directly through the bed to the mixing passage; and (d) second means formed through the enclosure means for defining a second flow path which leads from the bed through the annulus to the mixing passage.

More particularly, the enclosure means encompassing the catalyst bed is a sleeve, a bedplate and the upstream vessel end. The sleeve is spaced inwardly from the side wall of the vessel to define the annulus therebetween. The first means formed through the enclosure means is a plurality of openings through the bedplate which lead from the catalyst bed to the mixing passage. The second means formed through the enclosure means is a plurality of orifices through the sleeve which lead from the catalyst bed to the annulus and a plurality of holes through the bedplate which lead from the annulus to the mixing passage.

In the method performed by the dual gas generator, a propellant liquid injected under pressure through the injector into the catalyst bed separates into first and second fractions of the liquid. The first liquid fraction flows along the first path through the bed and concurrently is catalytically decomposed therein into a first fraction of propellant gas which exits through the bedplate openings into the mixing passage. The second, remaining liquid fraction overflows along the second path through the sleeve orifices into and through the annulus and concurrently is thermally decomposed therein by contact with the heated sleeve into a second fraction of propellant gas. The second gas fraction exits through the bedplate holes and into the passage wherein it mixes with the first gas fraction before exiting through the nozzle.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawing in which the single FIGURE is a longitudinal axial sectional view of a propulsive power-producing system vessel and a dual catalytic/thermal gas generator disposed therein which employs the principles of the present invention.

DETAILED DESCRIPTION OF THE INVENTION

Referring now to the single FIGURE of the drawing, there is shown a propulsive power-producing system vessel 10 housing a preferred embodiment of the dual catalytic/thermal gas generator of the present invention, being generally designed by the numeral 12. The vessel 10 is formed by a generally cylindrical side wall 14 and a pair of opposite end walls 16, 18 which together define a pressure chamber 20. An injector 22 connected to a suitable source of propellant liquid (not shown), such as hydrazine, is anchored to the upstream end wall 16 of the vessel 10 by a collar 24 and communicates with the chamber 20. A propellant gas thrust-producing nozzle 26 is integrally formed on the downstream end wall 18 of the vessel 10 and also communicates with the chamber 20.

The dual catalytic/thermal gas generator 12 basically includes a catalyst bed 28 composed of a material capable of catalytically decomposing the propellant liquid hydrazine. The bed 28 is disposed in the pressure chamber 20 of the vessel 10 in communication with the propellant liquid injector 22 in the upstream end wall 16 of the vessel 10. An enclosure means, generally designated 30, included in the dual gas generator 12 encompasses the catalyst bed 28 so as to define an annulus 32 between the side wall 14 of the vessel 10 and the bed 28 and a mixing passage 34 adjacent the downstream end wall 18 of the vessel 10 which leads from the bed 28 and the annulus 32 to the thrust-producing nozzle 26.

More particularly, the enclosure means 30 encompassing the catalyst bed 28 is composed of a tubular sleeve 36, a bedplate 38 and the vessel upstream end wall 16. The sleeve 36 is disposed in the pressure chamber 20 of the vessel 10, being attached at its upstream end to the upstream end wall 16 and spaced inwardly from the side wall 14 so as to define the annulus 32 therebetween such that the annulus is closed at its upstream end 40 by the peripheral marginal edge of the upstream end wall 16 of the vessel 10. The sleeve 36 at its opposite downstream end is spaced axially inwardly from the vessel downstream end wall 18. The bedplate 38 extends across the pressure chamber 20 and is attached at its peripheral edge to the vessel side wall 14 and inwardly from its peripheral edge to the downstream end of the sleeve 36. In such manner, the bedplate 38 closes the downstream end 42 of the annulus 32. The bedplate 38 generally circular and planar in configuration is disposed adjacent to but spaced axially inwardly from the vessel downstream end wall 18 so as to define the mixing passage 34 therebetween.

Additionally, the dual gas generator 12 includes first means in the form of a plurality of openings 44 formed through the central portion of the bedplate 38 which lead directly from the catalyst bed 28 to the mixing passage 34. The openings 44 which provide communication from the bed 28 to the mixing passage 34 thereby define a first flow path through the bed 28 to the nozzle 26 via the passage 34. Also the dual gas generator 12 includes second means in the form of (1) a plurality of orifices 46 defined through the upstream end of the sleeve 36 which lead from the upstream end portion of the catalyst bed 28 to the upstream end 40 of the annulus 32 and (2) a plurality of holes 48 defined through the peripheral edge of the bedplate 38 which lead from the downstream end 42 of the annulus 32 to the mixing passage 34. The orifices 46 and holes 48 which provide communication from the bed 28 through the annulus 32 to the mixing passage 34 thereby define a second flow path from the bed 28 through the annulus 32 to the nozzle 26 via the passage 34.

In the method of operation of the dual gas generator 12, when the propellant liquid is injected under pressure in the direction of arrow 50 through the injector 22 into the upstream end portion of the catalyst bed 28, it separates into first and second fractions. The first fraction of the liquid flows along the first path vertically through the bed 28 from the upstream toward the downstream end portion thereof. Concurrently, it is catalytically decomposed producing heat and a first fraction of catalytically-generated propellant gas which exits in the direction of arrows 52 through the bedplate openings 44 into the mixing passage 34.

The second, remaining fraction of the liquid overflows from the upstream end portion of the bed 28 along the second path in the direction of arrows 54 through the sleeve orifices 46 into and through the upstream end 40 of the annulus 32. The second propellant liquid fraction then flows toward the downstream end 42 of the annular 32 and concurrently is thermally decomposed therein producing heat and a second fraction of propellant gas by contact with the sleeve 36 which has been heated by the catalytic decomposition of the first propellant liquid fraction in the catalyst bed 28. The second fraction of thermally-generated propellant gas then exits in the direction of arrows 56 through the bedplate holes 48 and into the passage 34 wherein it mixes with the first fraction of catalytically-generated propellant gas before exiting the vessel 10 through its thrust-producing nozzle 26.

A number of tests were performed that demonstrate the significant difference in performance between the dual catalytic/thermal gas generator 10 of the present invention and a conventional catalytic gas generator. The following data in Table I is representative.

TABLE I

| Run | Configuration | Bedloading (#/sec-in) | Predicted Bed Drop (psid) | Measured Bed Drop (psid) | Difference (psi) |
|---|---|---|---|---|---|
| 87 | Dual | .93 | 707 | 91 | 616 |
| 88 | Dual | 1.14 | 861 | 115 | 746 |
| 89 | Dual | .88 | 516 | 79 | 437 |
| 90 | Dual | .95 | 552 | 79 | 473 |
| 91 | Dual | .75 | 320 | 52 | 268 |
| 93 | Conventional | .15 | 122 | 121 | 1 |
| 94 | Conventional | .22 | 179 | 172 | 7 |
| 95 | Conventional | .31 | 249 | 244 | 5 |
| 96 | Conventional | .10 | 51 | 51 | 0 |
| 97 | Conventional | .20 | 94 | 96 | (2) |

As can be seen, the measured bed drop for the dual gas generator configuration in each of Runs 87 through 91 is significantly less than the predicted bed drop. In Runs 93 through 97 which were performed with a conventional catalytic gas generator, the predicted bed drop calculation accurately reflects the expected or measured bed drop. These results clearly show that the dual gas generator operates with a lower pressure loss than a conventional generator.

All generators are limited to a maximum pressure drop by the compressive strength of the catalyst bed. The pressure drop of 244 psi in Run #95 is approaching this maximum limit. However, all tests with the dual gas generator design show acceptable pressure losses even when tested at bedloadings that would destroy a conventional catalytic gas generator.

It is thought that the dual catalytic/thermal gas generator of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. In a power-producing system having a vessel which includes a pressure chamber, an inlet for propellant liquid defined in an upstream end of said vessel chamber and an outlet for propellant gas defined in a downstream end of said vessel chamber and being spaced in an axial direction through said vessel chamber from said inlet, a dual gas generator, comprising:

(a) a single catalyst bed only, said catalyst bed having an upstream end portion being disposed in said vessel chamber in contact and communication with said propellant liquid inlet of said vessel chamber for receiving directly therefrom in the axial direction of said vessel chamber an injection of liquid propellant;

(b) a tubular sleeve disposed within and extending in the axial direction through said vessel chamber so as to surround the periphery of said catalyst bed between said upstream end portion and a downstream end portion thereof and defining an annulus at the exterior of said sleeve and within said vessel chamber, said sleeve having a plurality of orifices therethrough which interface with and lead from the periphery of said catalyst bed to said annulus; and (c) a bedplate transversely disposed across said vessel chamber at a downstream end of said sleeve and at said downstream end portion of said catalyst bed so as to define a catalyst-free mixing passage at the exterior of said bedplate which extends between said bedplate and said downstream end of said vessel chamber, said bedplate having a plurality of holes therethrough which interface with and lead from said downsteam end portion of said catalyst bed and a downstream end of said annulus to said passage for defining a first flow path which leads in the axial direction of said vessel chamber directly through said catalyst bed to said gas outlet via some of said bedplate holes and said mixing passage and (d) a second flow path which leads in a radial direction relative to the axial direction of said vessel chamber through said catalyst bed and said orifices in said sleeve and then in the axial direction along said annulus to said gas outlet via others of bedplate holes and said mixing passage, such that when a propellant liquid is injected under pressure through said vessel chamber inlet in the axial direction directly into said catalyst bed (i) a first fraction of the liquid flows along said first path and concurrently is catalytically decomposed into a first fraction of propellant gas which then flows into said passage and (ii) a second fraction of the liquid overflows along said second path and concurrently is thermally decomposed therein into a second fraction of propellant gas by contact with heat from the catalytic decomposition of the first liquid fraction in said bed, the second gas fraction then flowing into said passage wherein it mixes with the first gas fraction before existing through said vessel outlet.

2. The dual gas generator as recited in claim 1, wherein:

said vessel is formed by a side wall and opposite upstream and downstream end walls which define said pressure chamber; and said sleeve disposed in said vessel chamber is attached at one end to said vessel upstream end wall, spaced outwardly at an upstream portion from said propellant liquid inlet and spaced inwardly from said vessel side wall so as to define said annulus therebetween such that said annulus is closed at an upstream end by said vessel upstream end wall, said sleeve at an opposite end being spaced axially inwardly from said vessel downstream end wall.

3. The dual gas generator as recited in claim 2, wherein said orifices are defined through said sleeve adjacent said one end thereof which interfaces with said upstream end portion of said catalyst bed and an upstream end portion of said annulus so as to provide communication therebetween.

4. The dual gas generator as recited in claim 2, wherein said bedplate extends across said vessel pressure chamber and is attached to said vessel side wall and to said opposite end of said sleeve so as to close said downstream end of said annulus, said bedplate being disposed adjacent to but spaced axially inwardly from said vessel downstream end wall so as to define said mixing passage therebetween.

5. In a propulsive power-producing system having a vessel formed by a side wall and opposite end walls being spaced in an axial direction through said vessel from one another and defining a pressure chamber, a propellant liquid injector disposed in communication with said chamber at an upstream one of said vessel opposite end walls and a propellant gas thrust-producing nozzle defined on a downstream one of said vessel opposite end walls in communication with said chamber, a dual catalytic/thermal gas generator, comprising:

(a) a tubular sleeve disposed within and extending in the axial direction through said pressure chamber of said vessel, said sleeve at one end being attached to and closed by said upstream end wall of said vessel, said sleeve at an upstream portion being spaced outwardly from said propellant injector and being spaced inwardly from said side wall of said vessel so as to define an annulus therebetween which is closed at one end by said upstream end wall of said vessel, said sleeve at an opposite end being spaced axially inwardly from said downstream end wall of said vessel;

(b) a bedplate extending transversely across said pressure chamber of said vessel and being attached to said side wall of said vessel and to said opposite end of said sleeve so as to close said sleeve opposite end and an opposite end of said annulus defined between said sleeve and said vessel side wall, said bedplate being disposed adjacent to but spaced axially inwardly from said downstream end wall of said vessel so as to define a catalyst-free mixing passage in said pressure chamber communicating with and extending upstream from said thrust-producing nozzle on said downstream end wall of said vessel to said bedplate;

(c) a single catalyst bed only being disposed in said pressure chamber of said vessel and enclosed at its periphery by said sleeve and at its opposite downstream and upstream end portions by said bedplate and said upstream end wall of said vessel, said catalyst bed in contact and communication with said propellant liquid injector at said upstream end wall of said vessel for receiving directly from said injector an injection of liquid propellant;

(d) means defining a plurality of orifices through said sleeve adjacent said one end thereof which interface with said periphery of said catalyst bed at said upstream end portion thereof and with an upstream end portion of said annulus so as to provide communication therebetween;

(e) means defining a plurality of openings through said bedplate which interface with said downstream end portion of said catalyst bed and with said passage extending upstream of said vessel outlet so as to provide communication therebetween for defining a first flow path which leads in the axial direction of said vessel directly through said catalyst bed to said nozzle via said bedplate openings and said passage; and (f) means defining a plurality of holes through said bedplate which interface with a downstream end portion of said annulus and with said passage extending upstream of said vessel outlet so as to provide communication therebetween for defining a second flow path which leads in a radial direction relative to the axial direction of said vessel through said catalyst bed and said orifices in said sleeve and then in the axial direction along said annulus to said nozzle via said bedplate holes and said passage, such that when a propellant liquid in injected under pressure through said injector in the axial direction directly into said upstream end portion of said catalyst bed (i) a first fraction of the propellant liquid flows along said first path and concurrently is catalytically decomposed into a catalytically-generated fraction of propellant gas which exits through said openings in said bedplate and into said mixing passage and (ii) a second fraction of the propellant liquid flows along said second path and concurrently is thermally decomposed into a thermally-generated fraction of propellant gas by contact with said sleeve which has been heated by the catalytic decomposition of the first propellant liquid fraction in said catalyst bed, said thermally-generated fraction of propellant gas then exiting through said holes in said bedplate and into said mixing passage, the catalytically-generated and thermally-generated fractions of propellant gas then mixing together in said passage before exiting said vessel through said thrust-producing nozzle thereof.

6. In a power-producing system having a vessel being formed by a side wall and opposite end walls being spaced in an axial direction through said vessel from one another and defining a pressure chamber, an inlet for propellant liquid defined in an upstream one of said vessel opposite end walls and an outlet for propellant gas defined in a downstream one of said vessel opposite end walls, a dual gas generating method comprising the steps of:

(a) injecting a propellant liquid under pressure through the vessel inlet in the axial direction directly into a catalyst bed housed in the vessel pressure chamber;

(b) flowing a first fraction of the liquid along a first path in the axial direction through and in contact with the catalyst bed;

(c) catalytically decomposing the first liquid fraction, as it flows in the axial direction through and in contact with the bed along the first path, into a first fraction of propellant gas;

(d) flowing the first gas fraction from the bed through the openings therethrough into a mixing passage defined and extending between downstream of the bed and upstream of the vessel outlet;

(e) overflowing a second fraction of the liquid along a second path in a radial direction through the catalyst bed and the orifices of the sleeve and then in the axial direction along an annulus defined about the bed and between the vessel side wall and the bed;

(f) thermally decomposing the second liquid fraction into a second fraction of propellant gas, as it flows through the annulus, by contacting the second liquid fraction with heat from the catalytic decomposition of the first liquid fraction in the catalyst bed; and (g) flowing the second gas fraction from the annulus into the mixing passage where it mixes with the first gas fraction before exiting through the vessel outlet without passing through another catalyst bed.

* * * * *